(12) United States Patent
Hunt

(10) Patent No.: US 8,795,426 B2
(45) Date of Patent: Aug. 5, 2014

(54) REFLECTIVE ASPHALT COMPOSITION

(75) Inventor: Christopher Hunt, Yellowknife (CA)

(73) Assignee: 1616515 Alberta Ltd., Edmonton (CA)

( * ) Notice: Subject to any disclaimer, the term of this patent is extended or adjusted under 35 U.S.C. 154(b) by 113 days.

(21) Appl. No.: 13/638,578

(22) PCT Filed: Mar. 31, 2011

(86) PCT No.: PCT/CA2011/050174
§ 371 (c)(1),
(2), (4) Date: Dec. 7, 2012

(87) PCT Pub. No.: WO2011/120167
PCT Pub. Date: Oct. 6, 2011

(65) Prior Publication Data
US 2013/0160675 A1 Jun. 27, 2013

Related U.S. Application Data

(60) Provisional application No. 61/417,300, filed on Nov. 26, 2010.

(30) Foreign Application Priority Data

Mar. 31, 2010 (CA) ..................................... 2698507

(51) Int. Cl.
*C08L 95/00* (2006.01)
(52) U.S. Cl.
USPC .................................. 106/284.3; 106/284.02
(58) Field of Classification Search
USPC ........................................ 106/284.02, 284.3
See application file for complete search history.

(56) References Cited

U.S. PATENT DOCUMENTS

| 1,328,310 A | | 1/1920 | Willis | |
|---|---|---|---|---|
| 2,863,841 A | | 12/1958 | Bernier | |
| 3,291,011 A | | 12/1966 | Defregger | |
| 3,869,297 A | * | 3/1975 | Bellomy | 106/277 |
| 4,202,701 A | * | 5/1980 | Radebaugh et al. | 106/278 |
| 4,332,620 A | | 6/1982 | Quinn | |
| 4,335,186 A | | 6/1982 | Marzocchi | |
| 4,479,827 A | * | 10/1984 | Ward | 106/269 |
| 5,226,960 A | | 7/1993 | Punkert | |

(Continued)

FOREIGN PATENT DOCUMENTS

| CA | 2 688 340 A1 | 12/2008 |
|---|---|---|
| CA | 2 724 691 A1 | 11/2009 |

OTHER PUBLICATIONS

Jørgensen, A.S., and F. Andreasen, "Mapping of Permafrost Surface Using Ground-Penetrating Radar at Kangerlussuaq Airport, Western Greenland," Cold Regions Science and Technology 48(1):64-72, Apr. 2007 (cited in A.S. Jørgensen doctoral dissertation as Appendix A).

(Continued)

*Primary Examiner* — Helene Klemanski
(74) *Attorney, Agent, or Firm* — Christensen O'Connor Johnson Kindness PLLC

(57) ABSTRACT

An asphalt composition comprises aggregate, binder coating the aggregate and reflective particles embedded in the binder. In various embodiments, the binder may comprise one or more of clear bitumen, bio-bitumen or a polymer modified bitumen for cold application. The binder may comprise a glare control additive The reflective particles may be metal or metal oxide.

13 Claims, 1 Drawing Sheet

(56) References Cited

U.S. PATENT DOCUMENTS

| | | | |
|---|---|---|---|
| 5,362,316 A * | 11/1994 | Paradise | 106/278 |
| 6,245,850 B1 * | 6/2001 | Fields | 106/277 |
| 6,776,833 B2 * | 8/2004 | Yap et al. | 106/277 |
| 7,341,624 B2 | 3/2008 | Buras | |
| 8,562,864 B2 * | 10/2013 | Rodrigues et al. | 106/284.03 |
| 2003/0068469 A1 * | 4/2003 | Aschenbeck et al. | 428/150 |
| 2003/0152747 A1 * | 8/2003 | Fensel et al. | 428/143 |
| 2005/0072110 A1 * | 4/2005 | Shiao et al. | 52/741.1 |
| 2005/0072114 A1 * | 4/2005 | Shiao et al. | 52/782.1 |
| 2005/0074580 A1 * | 4/2005 | Gross et al. | 428/143 |
| 2006/0047019 A1 * | 3/2006 | Ravnskjaer et al. | 523/172 |
| 2007/0261337 A1 | 11/2007 | Whitaker | |
| 2008/0168926 A1 | 7/2008 | Muller | |
| 2010/0203336 A1 * | 8/2010 | Shiao et al. | 428/404 |
| 2011/0068308 A1 * | 3/2011 | Takaoka et al. | 252/587 |
| 2011/0146531 A1 * | 6/2011 | Mitra | 106/278 |

OTHER PUBLICATIONS

Jørgensen, A.S., and T. Ingeman-Nielsen, "The Impact of Light-Colored Pavements on Active Layer Dynamics Revealed by Ground-Penetrating Radar Monitoring," Proceedings of the 9th International Conference on Permafrost, Fairbanks, Alaska, Jun. 29-Jul. 3, 2008, pp. 865-868 (cited in A.S. Jørgensen doctoral dissertation as Appendix C).

Jørgensen, A.S., et al., "Assessment of the Effectiveness of Two Heat Removal Techniques for Permafrost Protection," Cold Regions Science and Technology 53(2):179-192, Jul. 2008 (cited in A.S. Jørgensen doctoral dissertation as Appendix B).

Jørgensen, A.S., "Assessment of Three Mitigation Techniques for Permafrost Protection : Roads and Airfields in the Arctic," doctoral dissertation, Arctic Technology Center, Dept. of Civil Engineering, Technical University of Denmark, Kongens Lyngby, Denmark, May 2009, 122 pages.

Jørgensen, A.S., and G. Doré, "Experimentation of Several Mitigation Methods in Tasiujaq Airport to Minimize the Effects Caused by the Melting of Permafrost," 14th Conference on Cold Regions Engineering, Duluth, Minn., Aug. 30-Sep. 2, 2009 (cited in A.S. Jørgensen doctoral dissertation as Appendix E).

Jørgensen, A.S., "Thermal Modeling of Variations in the Depth of the Frost Table Caused by Increasing Temperatures in Kangerlussuaq Airport, Western Greenland," Proceedings of the EUCOP III: Abstracts From the Third European Conference on Permafrost, Svalbard, Norway, Jun. 13-17, 2010 (cited in A.S. Jørgensen doctoral dissertation as Appendix D).

"Mexphalte C: Synthetic Pigmentable Bitumen," Product Information, PDS Number: 9259, Date Revised: Jun. 12, 2001, 3 pages.

"Reflective Aluminum Chips: Creating Uniform Aluminum Chips for Reflective Roofing," Product Fact Sheet, Office of Industrial Technologies, U.S. Dept. of Energy, Washington, D.C., Jan. 1999, 2 pages.

"Section 828—Hot Mix Asphaltic Concrete Mixtures," Department of Transportation, State of Georgia, Atlanta, available prior to Dec. 7, 2012, pp. 1-7.

* cited by examiner

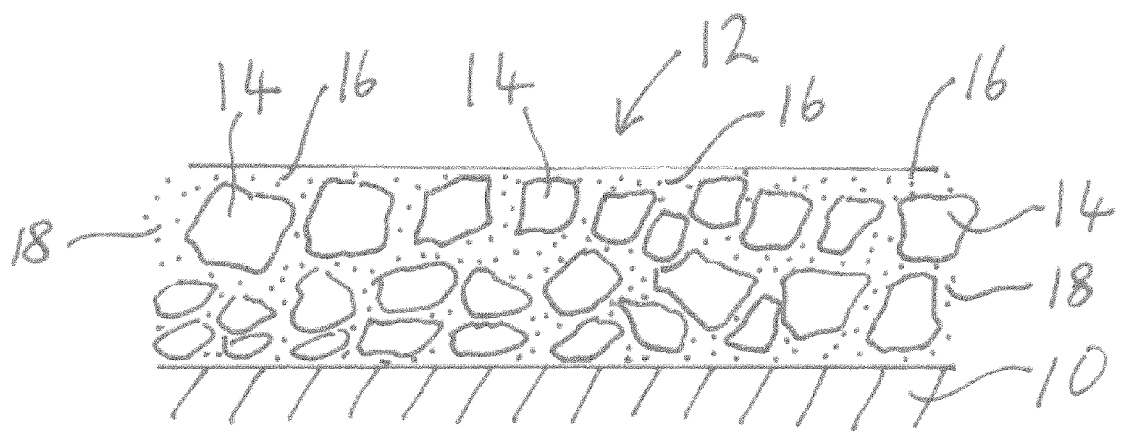

REFLECTIVE ASPHALT COMPOSITION

TECHNICAL FIELD

Construction of paved surfaces.

BACKGROUND

A conventional manner of making a road or other paved surface is to combine a hot bitumen as a binder with aggregate to create asphalt, transport the asphalt to a paving site and lay the asphalt at the paving site while the asphalt is still hot. Recent advancements in the paving of surfaces with asphalt have included use of polymer modified asphalts that contain an adhesive agent to allow the asphalt to be applied at a much lower temperature. These polymer modified cold asphalts permit a greater distance between the asphalt mixing plant and the paving site, which is desirable in many remote locations. Other advances include the mixing of pigments such as titanium dioxide into bitumen to change the colour of the asphalt, development of bitumen made from organic matter (bio-bitumen) and creation of clear bitumen. Conventional bitumen is black, but the blackening pigments may be removed during the production process to produce clear bitumen.

In the paving of surfaces, particularly in northern latitudes, it can be advantageous to prevent heat conduction to the ground under the paved surface. For this reason, coatings have been developed that reflect incident solar radiation. These coatings have been found to be useful in preventing undesirable sub-surface heat conduction, but the coatings tend to adhere poorly and become ineffective. A variety of reflective asphalt compositions are also known such as disclosed recently in U.S. patent publication No. 2008-0168926 and going back at least as far as U.S. Pat. No. 3,291,011, along with many others.

SUMMARY

There is thus provided an asphalt composition that provides reflective characteristics using embedded reflective particles. In one embodiment, the asphalt composition comprises aggregate, binder coating the aggregate, the binder being at least partially transparent to visible and infrared radiation, and reflective particles embedded within and coated by the binder. The reflective particles may be made of a reflective metal or metal oxide, such as aluminum or aluminum oxide, having fracture faces. The binder may comprise one or more of clear bitumen, bio-bitumen or a polymer modified bitumen for cold application. The binder may comprise a particulate modifier or glare control additive such as titanium dioxide. The reflective particles may be aluminum oxide or iron oxide with fracture faces for example cubic fracture faces. In the case of aluminum oxide being used as reflective particles, very small amounts of the reflective particles may be used, for example comprising less than 2.4% by weight or even as little as 0.02 or 0.01% by weight of the total asphalt composition. The binder may be sufficiently transparent or translucent to allow at least a portion, for example 10%, 20%, 30%, 40%, 50%, 60%, 70%, 80%, 90% or more, of radiation incident on the asphalt composition in the visible and infrared spectrum to penetrate the thickness of the binder, reflect off reflective particles embedded in the asphalt and exit the binder on a reflected path. These and other aspects of the composition are set out in the claims, which are incorporated here by reference.

BRIEF DESCRIPTION OF THE FIGURE

The FIGURE shows a section of an asphalt composition.

Embodiments will now be described with reference to the FIGURE, in which like reference characters denote like elements, by way of example, and in which the FIGURE shows a dispersion of aggregate and reflective particles in binder on a base.

DETAILED DESCRIPTION

An embodiment of an asphalt composition comprises aggregate, binder coating the aggregate, the binder being at least partially transparent to visible and infrared light; and reflective metal or metal oxide particles embedded within and coated by the binder, the metal or metal oxide particles having fracture faces.

The aggregate comprises any suitable aggregate used in the asphalt paving industry, and will typically include small stones or rock fragments made predominantly of quartz and silicates.

The binder may comprise a variety of partially transparent bitumens, such as one or more of clear bitumen, bio-bitumen and a polymer modified bitumen for cold application. Clear bitumen may be obtained from any of a number of sources such as Ventraco Chemie B. V. of Holland or Suncor Energy of Calgary, Canada. Clear bitumen may be synthetic or produced from a naturally occurring feedstock, such as oil sands. An example of clear bitumen is Mexphalte™ clear bitumen available from Shell of The Hague, Netherlands. Clear bitumen in the thickness of a typical asphalt binder is at least partially transparent. The bitumen binder may also comprise any of various forms of bio-bitumen, made from non-petroleum low molecular weight materials such as lignin, cellulose, molasses, sugar, natural tree resins, gums, vegetable oils, wastes from vegetable oil production, potato, wheat and rice starches and distillation bottoms derived in the process of cleaning used motor oils. An example of bio-bitumen is Bitumen GEO320 available from Ecopave of Australia. The bitumen may be a polymer modified bitumen for cold application, in which any of various forms of synthetic, natural or biologically derived bitumen may have an adhesive polymer added to permit application at cold temperatures, for example below 90 C.

A desirable property of the binder used is high emissivity, particularly in the infrared range, so that the asphalt composition does not absorb heat. It has been found that partially transparent bitumen, such as materials known as clear bitumen provide a suitable emissivity.

The binder may also include a glare control additive such as titanium dioxide for white color, and other pigments. Iron oxides may be used to produce green, blue, red, orange or yellow colour, titanium dioxide for white, chromium dioxide for green and cobalt oxide for blue. The glare control additive is added in an amount sufficient to provide a desirable balance between reducing glare and permitting reflection from the reflective particles. The binder is partially transparent or translucent and allows at least a portion, for example 10%, 20%, 30%, 40%, 50%, 60%, 70%, 80%, 90% or more, of radiation incident on the asphalt composition in the visible and infrared spectrum to penetrate the thickness of the binder, reflect off reflective particles embedded in the asphalt and exit the binder on a reflected path. Green colour for the asphalt is particular suitable since green has a high albedo.

The reflective particles comprise metal or metal oxides having fracture faces. The reflective particles may have various sizes and in one embodiment have a largest dimension less than 0.2 mm. The reflective particles may be uniformly sized in an embodiment, and in other embodiments may have a range of sizes. Preferably, the reflective particles do not absorb binder. When the reflective particles do not absorb binder, the resulting asphalt composition may be made more durable. In other embodiments, the reflective particles may comprise metal oxides and may be crystalline. The reflective particles may be present in an amount 1-20 wt % such as 2%, 4%, 6%, 8% or 10% of the liquid binder. Hence, the reflective particles may be present in an amount as small as 2.4% by weight of the entire asphalt composition, or even as low as 0.02 wt % or 0.01 wt %. If the particulate modifier also has fracture faces, then the total reflective particles composition may reach 4 wt % but may be as low as 0.4 wt % or 0.2 wt % or 0.1 wt % or 0.01% of the total asphalt composition.

The reflective particles may be added to the asphalt at any suitable stage of production, for example may be mixed with aggregate before binder is added, or added to binder before mixing with aggregate, or added to the mixed binder and aggregate. The glare control additive may be added to the binder in a conventional manner for the addition of pigment to binder either at an asphalt mixing plant or at a work site. For hot applied bitumen, the reflective particles may be added to the aggregate and the glare control additive added to the binder before the binder is mixed with aggregate. During production, the binder should be present in a sufficient amount to coat the reflective particles and aggregate to bind the materials together and ensure that the reflective particles are embedded within and coated by binder.

For a cold applied asphalt, a hot mix asphalt plant may also be used for production of the surfacing material. The aggregate is first dried by heating then allowed to cool, for example to 80 C-90 C. The aggregate is then introduced back into the hot mix plant with no flame, or introduced into another suitable mixing container such as a pugmill, and is then mixed with the reflective particles, the binder and the glare control agent. The aggregate and reflective particles are then mixed with binder and glare control agent.

The proportion of binder in the resulting asphalt composition may be a conventional amount in relation to the total solids, The amount is selected to coat the aggregate and bind the aggregate together. An embodiment of a ratio of binder to aggregate or binder to total solids, including aggregate and reflective particles, is an amount such that the asphalt composition has a durability suitable for use on a highway that is subject to truck traffic. Examples are 3-5% by weight binder of the total asphalt composition for a cold applied asphalt and 5-8% by weight binder of the total asphalt composition. The amount of reflective particles is preferably sufficient to provide a desired amount of reflectivity but not so much that the reflective particles compete excessively with the aggregate for the binder. The amount of binder is preferably sufficient to coat both the aggregate and the reflective particles. Hence, the binder may be present in a conventional weight percent of the total solids, where in this case the solids comprise both aggregate and reflective particles. The weight percent of binder to total solids may be for example 1% to 12%.

An exemplary application is shown in the figure. Base 10 is a conventional prepared sub-surface for paved surfacing. Asphalt composition 12 comprises aggregate 14, reflective aluminum oxide particles 16 and titanium oxide particles 16 and binder 18. The asphalt composition 12 may be a road, parking lot, airstrip, sidewalk or any other paved surface.

The asphalt composition with embedded reflective particles provides UV protection for reduced breakdown of material (longer lasting road surface), and by increased albedo of the surface mitigates effects of increased greenhouse gases. When installed over permafrost, the asphalt composition provides permafrost thaw mitigation.

In an embodiment for particular use with a cold applied asphalt, the binder may comprise a total of 1-12% by weight of the asphalt composition. Of the total binder material, between 0.4 and 1.5% by weight may be asphalt cement used in a pre-mix stage in which the aggregate and asphalt cement are combined in a hot mix stage at around 300 F. The aggregate may be a ⅜" washed rock or any other suitable gradation or type of aggregate. In a second stage, the cooling combined aggregate and initial binder is run back through the plant with no flame and mixed with the remaining binder liquid which is a blend of binder and an adhesive polymer adhesive. Depending on the liquid binder used, a diluent such as diesel may be added to the liquid binder, for example in an amount of 20-30% by weight of the total liquid binder. Adhesive polymer additive may make up 3-10% by weight of the final blended binder. The glare control additive (for example, titanium oxide) and reflective particles (for example reflective aluminum oxide or other reflective metal oxide) may each be added in amounts of 0.01% to 2.4% of the weight of the total asphalt composition or such other amount that is suitable for the desired amount of reflectivity and colour.

In an embodiment in which reflective oxide particles are used as reflective particles, the particles may comprise 100 grit aluminum oxide. The reflective particles such as aluminum oxide have fracture faces that provide the reflectivity function. The reflective particles may have a cubic structure. The reflective particles may have dimensions each 0.05 to 0.2 mm long, or in some embodiments the dimensions of reflective particles may be up to 2 mm long.

In an embodiment, liquid binder comprises particulate modifier such as titanium dioxide present in an amount from 2-20% by weight of the liquid components, as for example 2%, 4%, 8% and 12%. The liquid components may comprise any of the binders previously mentioned and may in one embodiment comprise for example 67% by weight Mexphalte™ clear bitumen binder, 30% by weight diesel and 3% by weight adhesive polymer. Reflective particles may be added that comprise 1-20% by weight of the liquid components of the liquid binder. In this and other embodiments, aluminum oxide grit may be used as the reflective particles. Asphalt compositions with for example 6 parts by weight liquid binder (including the titanium dioxide and the reflective particles), 94 parts by weight aggregate, where reflective particles, namely 100 grit aluminum oxide cubic particles, are present in an amount of about 2%, 4%, 8% and 12% and up to 20% by weight of the liquid components of the binder (not including aggregate) and titanium dioxide is added as a modifier or glare control additive in amounts of 2%, 4%, 8% and 12% and up to 20% by weight of the liquid components of the binder have been found to provide a suitable albedo and emissivity. Green and blue asphalt compositions of the type disclosed in this paragraph with reflective aluminum oxide particles, clear bitumen as the liquid binder and TiO2 for colour and UV protection have been found to have a suitable combination of reflectivity, emissivity and colour.

In another embodiment, the binder may be applied to a gravel road and then the reflective material rolled into the binder. Additional gravel or aggregate may also be added to the road before, with or after applying the binder, and before, with or after applying the reflective material to the road. The binder may include a glare control additive, and may be any of the binders disclosed in this patent document, including clear bitumen. As an example, clear bitumen with titanium oxide may be applied to a gravel road and then aggregate and reflective material such as aluminum strips cold rolled onto the oiled road.

Albedo and Emissivity Testing

Samples tested all using mix design of 94 parts by weight aggregate and 6 parts by weight binder blend (clear binder (Mexphalte™), plus titanium dioxide rutile form and light grey aluminum oxide 100 grit. The amounts of titanium dioxide (TD) and aluminum oxide were varied from 1 to 20 wt % (0.06 to 1.2 parts by weight) titanium dioxide and from 1 to 20 wt % (0.06 to 1.2 parts by weight) aluminum oxide by weight of the liquid components of the binder. With 0.48 parts by weight TD and 0.12 parts by weight aluminum oxide the albedo is 0.40 and with 0.24 parts by weight TD and 0.12 parts by weight aluminum oxide the albedo is 0.39 albedo. The highest albedo levels (0.40 using a albedo field test with a digital camera and software) were achieved with 0.12 parts by weight aluminum oxide and 0.48 parts by weight Titanium Dioxide. At the higher amounts of each of titanium dioxide or aluminum oxide there was no increase in albedo. The 0.40 albedo compares well with concrete, having an albedo around 0.35.

The albedo testing followed procedures detailed in "Snow Surface Albedo Estimation using Terrestrial Photograph, Int. J. Remote Sensing, 20 Dec. 2004, vol. 25, no. 24, pages 5705-5729 and photoanalysis software ImageJ available from the National Institute of Health.

In testing of emissivity $\epsilon$, for black asphalt $\epsilon=0.94$ and for 94 parts by weight aggregate with 6 parts by weight binder blend (clear binder—Mexphalte™) along with titanium dioxide rutile form, light grey aluminum oxide 100 grit and green oxide colour, the amounts 0.48 parts by weight titanium dioxide and 0.12 parts by weight aluminum oxide, 0.12 parts by weight green oxide, tests show $\epsilon=0.89$. The emissivity was measured using a Fluke TI-55 Thermal Imager. For emissivity testing, background temperature was measured using tinfoil as a reflective medium. The average temperature of the test area was used as background temperature, Tamb. A water 'Hot bath' was used to heat a ceramic plate upon which was placed the asphalt. The asphalt was heated to approximately 83° C. Any item or material whose emissivity is to be measured requires a temperature of at minimum 33° C. above Tamb. The areas of the asphalt chosen to use as measurement were smaller pieces that were in close proximity to the emissivity comparison strip. Black electrical tape was used as the emissivity comparison strip as it has a known emissivity of 0.95.

Hence, the significant increase in albedo created by the combination of binder, titanium dioxide and aluminum oxide did not sacrifice emissivity. By comparison, new black asphalt is a standard 0.90 on the emissivity scale but only 0.05 in albedo (one of the lowest levels recordable and often used as an example of the lowest albedo on earth).

This gives black asphalt a Solar Reflective Index SRI of 0. The 0.40 albedo material created by the combination of aggregate (in this case 94 parts by weight), 6 parts by weight binder blend, 0.48 parts by weight titanium dioxide and 0.12 parts by weight aluminum oxide combined with its 0.89 emissivity result would give it a SRI of 45.

SRI as used here is calculated with a formula spelled out in ASTM E1980 and is a scale of 1 to 100 that is a measure of a roofs combined thermal properties. It is defined so that a standard black (reflectance 0.05, emittance 0.90) is 0 and a standard white (reflectance 0.80, emittance 0.90) is 100. But some hot roofs can have negative values, and some white thermoplastics and white roof coatings have scored as high as 104 to 100.

The titanium dioxide is selected for its known desirable features as an additive for asphalt including color and UV protection for the asphalt. The reflective particles are selected to provide reflectivity, emissivity, UV protection for the asphalt and the titanium dioxide and to break up the titanium dioxide particles so that they do not agglomerate. One of the advantages that the inventor has discovered is that relatively small amounts of metal or metal oxide reflective particles such as aluminum or aluminum oxide particles added to an asphalt provide an improvement in reflectivity. However, better results are believed to be obtained by using titanium dioxide in combination with the aluminum or aluminum oxide particles. Due to their similar properties, zinc oxide or niobium oxide might be substituted for titanium dioxide as a glare control additive but both are expensive and the zinc oxide does not have as good characteristics as the titanium dioxide for use in asphalt applications.

Titanium dioxide is a common component of asphalt compositions and is preferably used in the disclosed compositions in its conventional form as a fine particulate or powder. In an embodiment in which aluminum is used for reflective particles, the aluminum may have the form of fine particles, or thin strips less than 1 cm long, having a width greater than depth and both the depth and width being of the order of 1 mm. Such strips may be obtained from waste processing of aluminum products such as metal cans.

Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An asphalt composition, comprising:
    aggregate, binder coating the aggregate, the binder being at least partially transparent to visible and infrared radiation;
    titanium dioxide in the binder; and
    reflective particles embedded within and coated by the binder, the reflective particles being aluminum or aluminum oxide particles having fracture faces.

2. The asphalt composition of claim 1 in which the binder comprises clear bitumen.

3. The asphalt composition of claim 1 in which the binder comprises bio-bitumen.

4. The asphalt composition of claim 1 in which the binder comprises a polymer modified bitumen for cold application.

5. The asphalt composition of claim 1 in which the reflective particles are aluminum oxide particles present in an amount of from 1% to 20% by weight of liquid components of the binder.

6. The asphalt composition of claim 5 in which the aluminum oxide particles have dimensions each less than 0.2 mm.

7. The asphalt composition of claim 1 in which the reflective particles are present in an amount of from 0.01% to 2.4% by weight of the asphalt composition.

8. An asphalt composition, comprising:
    aggregate, binder coating the aggregate, the binder being at least partially transparent to visible and infrared radiation; and
    reflective metal or metal oxide particles embedded within and coated by the binder, the metal or metal oxide particles having fracture faces, the reflective metal or metal oxide particles being present in an amount of from 0.01% to 2.4% by weight of the asphalt composition.

9. The asphalt composition of claim 8 further comprising a glare control additive in the binder.

10. The asphalt composition of claim 9 in which the glare control additive comprises titanium dioxide.

11. The asphalt composition of claim 8 in which the binder comprises clear bitumen, bio-bitumen or a polymer modified bitumen for cold application.

12. The asphalt composition of claim 8 in which the reflective particles comprise reflective metal or metal oxide particles present in an amount from 1% to 20% by weight of liquid components of the binder.

13. The asphalt composition of claim 1 in which the asphalt composition has the color green.

* * * * *